O. ALLEN.
BUTTER MOLD.

No. 46,319. Patented Feb. 14, 1865.

Witnesses:
C L Topliff
Theo Tusch

Inventor:
Oliver Allen
per Munn & Co
Attorneys

UNITED STATES PATENT OFFICE.

OLIVER ALLEN, OF SAN FRANCISCO, CALIFORNIA.

IMPROVED BUTTER-MOLD.

Specification forming part of Letters Patent No. 46,319, dated February 14, 1865.

*To all whom it may concern:*

Be it known that I, OLIVER ALLEN, of San Francisco, in the county of San Francisco and and State of California, have invented a new and Improved Butter-Mold; and I do hereby declare that the following is a full, clear, and exact description thereof, which will enable those skilled in the art to make and use the same, reference being had to the accompanying drawings, forming part of this specification, in which—

Figure 1:
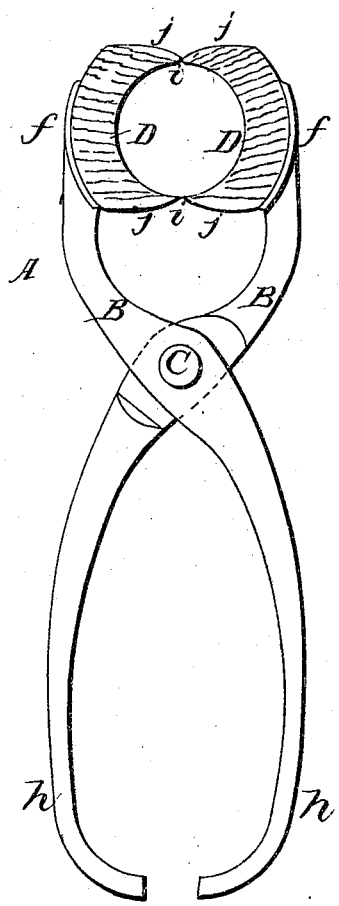
Figure 2:
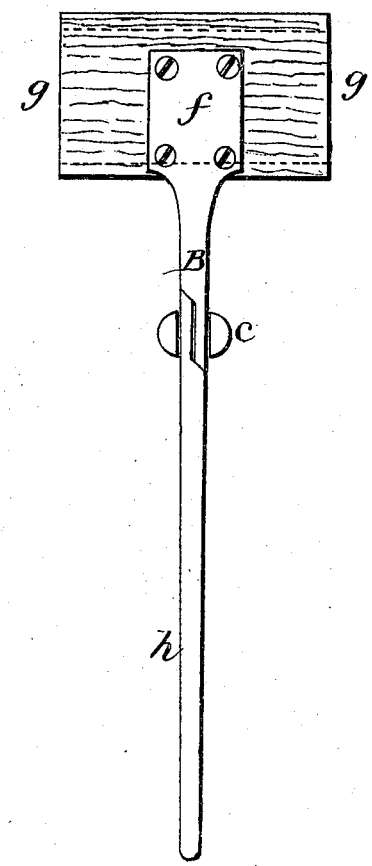

Figure 1 is an end view of a butter-mold made according to my invention. Fig. 2 is a side view thereof.

Similar letters of reference indicate like parts.

This invention consists in forming a mold by which butter may be divided into parcels of such a shape and quantity as are required in preparing it for market, the mold being varied in size and shape to suit the demand or the fancy which prevails in different communities or markets.

The mold A is formed in the example here shown of two semicircular pieces, D, of hard wood, whose edges are brought together at $i$. The said edges are made sufficiently sharp or thin to enable them to pass easily through the butter, and their outer parts, $j$, are rounded off or otherwise so shaped as that the mold will easily clear itself of the butter left outside of it.

The mold here shown is made so as to form a "roll" of butter; but it is evident that it may be made of any other form—to wit, it may be oblong or elliptical in cross-section, or square or flat. The ends of the mold here shown are cut off at $g$ in parallel lines.

B B are tongs hinged at C, their longer arms, $h\ h$, forming handles by which they are operated, and their shorter arms being formed at their ends into plates $f\ f$, which are attached to the backs of the semi circular pieces D D by screws or any other proper way. The contour of the shorter arms of the tongs is to be such and the halves of the mold are to be so fixed to them as will bring both the edges $i$ of the mold together at the same moment.

The mold is operated by opening the handles $h$, placing the halves D about a piece of butter or seizing it therewith, and then bringing the handles together, when the mold will inclose a quantity of butter which will be conformed to its shape. The ends of the piece of butter which protrude beyond the sides $g$ are then removed by means of a knife of wood or of other suitable material.

Having thus described my invention, I claim and desire to secure by Letters Patent as a new and improved article of manufacture—

A butter-mold constructed and operating substantially in the manner herein shown and described.

OLIVER ALLEN.

Witnesses:
  EUGENE B. DRAKE,
  F. A. GUSHEE.